United States Patent [19]

Kikuya et al.

[11] 4,197,562
[45] Apr. 8, 1980

[54] METHOD OF SLOW-MOTION PLAY BACK OF VIDEO SIGNALS AND VIDEO TAPE RECORDER FOR SAME

[75] Inventors: Satoshi Kikuya; Toshinori Morikawa; Shinichi Harazono, all of Kadoma, Japan

[73] Assignee: Matsushita Electric Industrial Company, Japan

[21] Appl. No.: 886,948

[22] Filed: Mar. 15, 1978

[30] Foreign Application Priority Data

Mar. 17, 1977 [JP] Japan .................................. 52-30119

[51] Int. Cl.² .......................... H04N 5/78; G11B 5/02
[52] U.S. Cl. ....................................... 360/10; 360/64
[58] Field of Search .................. 360/33, 21, 64, 10, 360/130, 70, 77, 75, 130.23, 11

[56] References Cited

U.S. PATENT DOCUMENTS

| 3,678,186 | 7/1972 | Narita | 360/70 |
| 3,699,247 | 10/1972 | Mashima | 360/10 |
| 3,821,787 | 6/1974 | Kihara | 360/70 |

Primary Examiner—Bernard Konick
Assistant Examiner—Alan Faber
Attorney, Agent, or Firm—Robert E. Burns; Emmanuel J. Lobato; Bruce L. Adams

[57] ABSTRACT

Two auxiliary heads are provided in addition to the two main heads for a helical scan video signal tape recorder. The vertical and horizontal positions of the auxiliary heads are determined so as to effectively reproduce a slow-motion picture from a magnetic tape on which the signals are recorded using the so called "azimuth" recording method. The output of each head is selectively supplied to a video signal demodulating circuit via a switching circuit.

13 Claims, 29 Drawing Figures

METHOD OF SLOW-MOTION PLAY BACK OF VIDEO SIGNALS AND VIDEO TAPE RECORDER FOR SAME

FIELD OF THE INVENTION

This invention generally relates to a method and an apparatus for slow-motion reproduction in a multi-head type helical scan video signal tape recorder. More specifically, the present invention relates to such a reproduction of recorded signals recorded by so called azimuth recording method.

BACKGROUND OF THE INVENTION

There are basically two types of helical scan video signal tape recording methods. One is the separated track method and the other is the "azimuth" recording method. In the separated track method, each track is arranged in parallel on a magnetic tape with a predetermined distance of space therebetween. This space between tracks is called a guard band and no signal is recorded thereon so that interference (crosstalk) between two tracks is avoided.

In the azimuth recording method, each track is positioned in parallel on the magnetic tape without a space, i.e. no guard band, where signals are recorded by arranging the azimuth of the two heads (gap orientation) in opposite directions with respect to the traverse direction of the track. Since a signal is recorded on an adjacent (next) track of a main track by a second head the gap orientation of which is different from that of the first head with which a signal is recorded on the main track, when reproducing, the signal recorded on the adjacent track is not effectively reproduced viz. very low output is obtained, by the first head due to the azimuth loss. This azimuth recording method is advantageous when the signal is reproduced at a normal tape speed since crosstalk between tracks is effectively reduced by using the correct (corresponding) head between two heads for each track. With the azimuth recording method, tape-saving is achieved since the tracks are positioned on a magnetic tape without any spaces.

Assuming a main track is recorded by a first head while an adjacent track is recorded by a second head by the azimuth recording method, when the signal is reproduced at a slow-motion tape speed, a signal recorded on the adjacent track is not effectively reproduced by the first head while the signal recorded on the main track is not effectively reproduced by the second head when the first and second heads respectively scan the main and adjacent tracks, because of the azimuth loss.

Since the first and second heads are arranged to alternatively scan a track or tracks, the above mentioned low output signal is obtained periodically. This undesirable low output causes the slow-motion picture on the picture tube to assume a poor quality. Therefore, the quality on the picture of the picture tube varies periodically.

SUMMARY OF THE INVENTION

The present invention is developed to overcome the above mentioned drawback of the conventional method and apparatus of the slow-motion reproducing of video signals recorded by the azimuth recording method.

According to the present invention two auxiliary heads are provided in addition to main (first and second) heads which are inherent in the conventional type. The two (third and fourth) auxiliary heads are utilized only for slow motion reproduction. These four heads are disposed in a rotary drum or a cylinder so as to rotate simultaneously. The gaps in the first and third heads are arranged such that they are skewed with respect to the axis of rotation of the drum by the same degree while the gaps in the second and fourth heads are arranged such that they are skewed with respect to the axis of rotation of the drum by an equal but opposite degree as compared with the gaps of the first and third heads. The third and fourth heads are respectively positioned adjacent to the first and second heads. The vertical and horizontal positions of the third and fourth heads with respect to the first and second heads are determined so as to effectively reproduce signals on the corresponding track. With this arrangement, the four heads reproduce the recorded signals when the heads respectively scan the corresponding track even though the tape slide on the peripheral surface of the drum at slow-motion speed. The output signals of each head is utilized effectively in a video signal reproducing circuit by switching the outputs of the four heads.

It is therefore, an object of the present invention to provide an improved slow-motion reproducing method and apparatus in which recorded video signals recorded by the azimuth recording method is effectively reproduced so as to obtain a high quality slow-motion picture.

BRIEF DESCRIPTION OF THE DRAWINGS

The features of the invention will become more readily apparent from the following detailed description taken in conjunction with the accompanying drawings in which:

FIG. 2 shows schematically recorded signals on tracks of the magnetic recording tape shown in FIG. 1a;

FIG. 4b shows a schematic developed view of four heads shown in FIG. 4a;

FIG. 5 shows schematically tracks and the slow-motion scanning positions of the four heads shown in FIG. 4a;

FIG. 6a to FIG. 9e show various possible arrangements of the auxiliary heads such as shown in FIGS. 4a and 4b.

DETAILED DESCRIPTION OF PREFERRED EMBODIMENTS

Figure 1A:
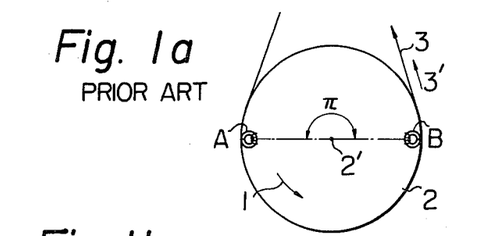
FIG. 1a shows relationship between a magnetic recording tape and a rotary drum of the conventional type of a video signal tape recorder.

FIG. 1a illustrates a rotary drum and a magnetic recording tape utilized in a conventional type of azimuth recording method video signal tape recorder. First and second heads A and B are respectively disposed in a cylindrical rotary drum 2. The angle between these first and second heads A and B with respect to the axis 2' of the rotary drum 2 is $\pi$ radian (180 degrees). A magnetic tape 3 is arranged to helically slide on the peripheral surface of the drum 2. The directions of the movement of the rotary drum 2 and the magnetic tape 3 are the same and indicated by directed lines 1 and 3'. However, the direction of either the rotary drum 2 or the magnetic tape 3 can be reversed if desired. The output signals of the first and second heads A and B are switched by a switching circuit (not shown) so that each head substantially scans a corresponding track, i.e. a track recorded by the same head, on the magnetic tape 3 when normal reproduction is performed.

Figure 1B:
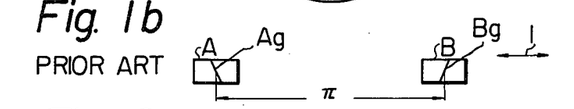
FIG. 1b shows a schematic developed view of heads shown in FIG. 1.

Reference is now made to FIG. 1b which shows a schematic developed view of the first and second heads A and B. Each head has a gap $A_g$ and $B_g$ and the orientations of the gaps with respect to the traverse direction of tracks on the magnetic tape 3, are different from each other. It is to be noted that the vertical height of the first and second heads A and B are same. The above mentioned azimuth recording method is disclosed, for instance, in "Electronics" (pages 106–113) published in Nov. 24, 1977.

Figure 2:
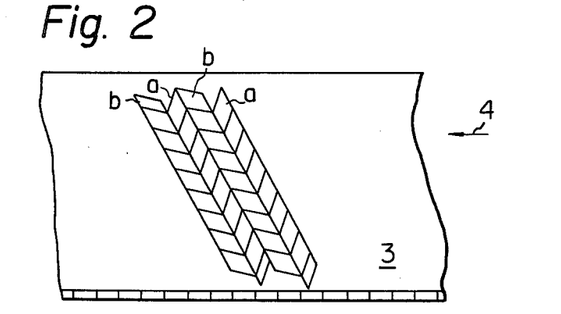

FIG. 2 illustrates some tracks recorded on the magnetic tape 3. Track "a" is recorded by the first head A while another track "b" is recorded by the second head B. As the magnetic tape 3 moves rightward at a relatively low speed, and the rotary drum 2 rotates counterclockwise at a relatively high speed, sequential parallel tracks are recorded with video signals in turn. Since video signals are recorded by the first and second heads A and B the gap width directions of which are different from each other, the angular displacement of the magnetized portions on the magnetic tape 3 are different from that of the adjacent (next) one.

Figure 3:
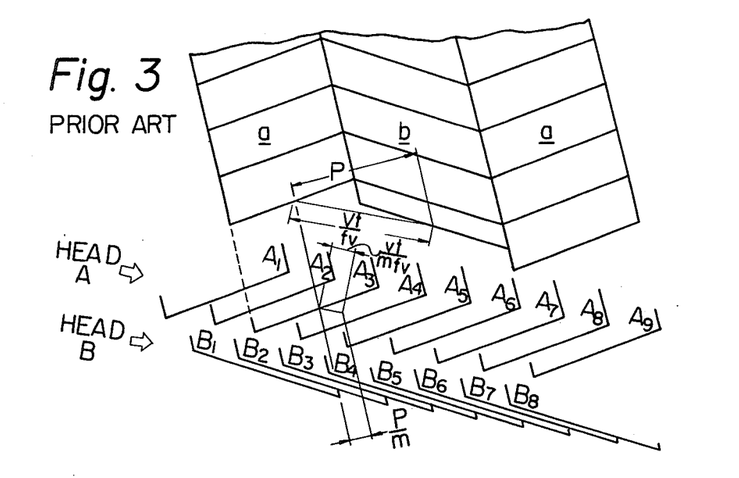
FIG. 3 shows schematically tracks and slow-motion scanning positions of the two heads shown in FIG. 1.

FIG. 3 illustrates an enlargement of the tracks shown in FIG. 2 and the scanning positions of the first and second heads A and B. When slow-motion reproduction is performed, the speed of the magnetic tape 3 is reduced to a predetermined extent, for instance one sixth of the normal speed, while the rotary drum 2 rotates at the same speed as normal. Scanning positions shown in FIG. 3 are obtained when the slow-motion speed ratio "m," i.e. an integer indicative of normal tape speed divided by the slow-motion tape speed, is 6. With this provision, each tracks are scanned by heads A and B with a predetermined pitch indicated by p/m (the track pitch "p" divided by the slow-motion speed ratio "m"). Since the magnetic tape 3 moves so slowly that the longitudinal directions of each track has a slight angle difference from the directions of the head scan path, the magnetic tape 3 is partially pushed or shifted up or down so that the scan path directions accord with the longitudinal directions of the tracks "a" and "b." This technique is well known and described, for instance, in U.S. Pat. No. 3,699,247 and thus a device or means for achieving same is not further discussed.

As shown in FIG. 3 the first head A hardly reproduces video signals when the scanning position thereof is $A_6$ while the second head B hardly reproduce video signals when the scanning position thereof is at $B_2$. This means that the quality of the reproduced slow-motion picture is periodically deteriorated.

Figure 4A:
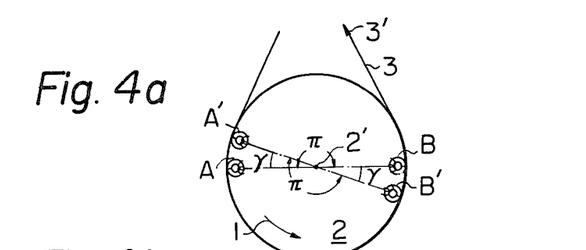
FIG. 4a shows the relationship between a magnetic recording tape and a rotary drum of a video signal tape recorder according to the present invention.

FIG. 4a illustrates a rotary drum and a magnetic tape utilized in a video signal tape recording and reproducing method and an apparatus for achieving same according to the present invention. The construction of the rotary drum 2 is same as that shown in FIG. 1a except that third and fourth auxiliary heads A' and B' are additionally provided. The third head A' is disposed in the rotary drum 2 adjacent to the first head A with a predetermined angle $\gamma$ while the fourth head B' is disposed in the rotary drum 2 adjacent to the second head B with a predetermined angle $\gamma$. The angle between the third and fourth heads A' and B' with respect to the axis 2' of the rotary drum 2 is $\pi$ radian (180 degrees).

Figure 4B:
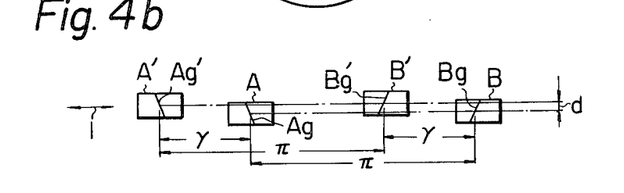

As shown in FIG. 4b, when the axis of rotation of the rotary drum 2 is arranged vertically, the vertical positions of the third and fourth heads A' and B' are the same and higher than that of the first and second heads A and B to a predetermined extent "d" where "d" is same as the track pitch "p." The gap longitudinal orientation of the third head A' is same as that of the first head A while the gap longitudinal orientation of the fourth head B' is same as that of the second head B.

Since the rotary drum 2 rotates counterclockwise, the fourth head B' scans a track following a track which the first head A scans. In the same manner the second head B scans a track following a track scanned by the third head A'.

Figure 5:
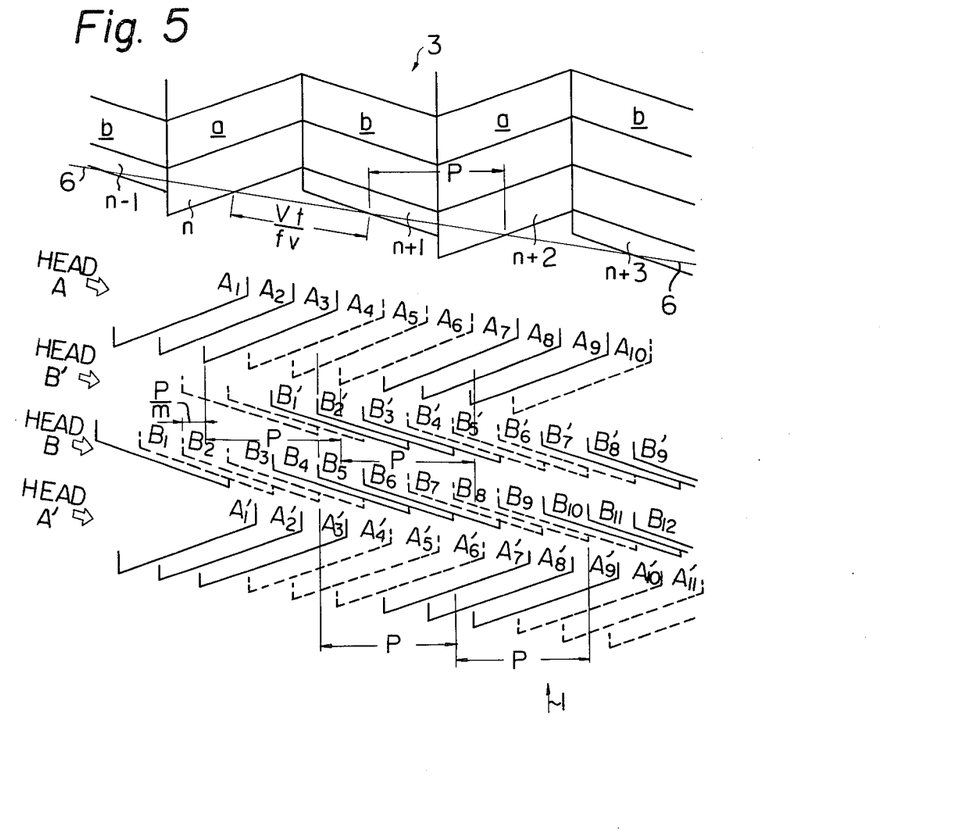

Reference is now made to FIG. 5 which shows an enlargement of the tracks shown in FIG. 4b and the scanning positions of the first, second, third and fourth heads A, B, A' and B'. The line 6–6' indicates switching positions of the first and second heads A and B while the switching positions of the third and fourth heads A' and B' are not shown but which trail the first and second heads A and B by the angular difference $\gamma$ therebetween. A video track pitch "p" is determined by the following equation:

$$p = (V_t/f_v) \cdot (W/l)$$

In the above $V_t$ is a tape speed, $f_v$ is a field frequency, W is a video signal width on a magnetic tape, and l is a track length.

With this arrangement each head A, B, A' and B' respectively scans a track in a predetermined order, i.e. $A_1, A_2, A_3 \ldots, B_1, B_2, B_3 \ldots, A'_1, A'_2, A'_3 \ldots, B'_1, B'_2, B'_3 \ldots$, as shown in FIG. 5. Among all scan positions, valid scan positions viz. those in which adequate output is obtained since the azimuth of the head accord with that of the recorded signals, are indicated by solid lines; while invalid scan positions viz. those in which inadequate output is obtained since the azimuth of the head does not accord with that of the recorded signals, are indicated by dotted lines. The output signals derived from the valid scan positions are selectively supplied via a switching circuit to a video reproducing circuit. Therefore, only the valid scans are utilized to reproduce the recorded video signals.

Hereinafter a detailed description of the slow-motion reproducing operation will be made in conjunction with FIG. 5. Assuming the first head A has scanned a track "a" of the first row "n" at the scanning position $A_1$, the fourth head B' indicates scanning a track "b" of the second row "n+1." It is to be noted that the vertical position of the fourth head B' is higher than that of the second head B by "d" where "d" is the same length as the track pitch "p". With this arrangement the fourth head B' does not scan the track "a" at the position $B_1$ but scans the track "b" at the position $B'_1$. Therefore, the first and fourth heads A and B' alternatively scan the track "a" of the first row "n" and the track "b" of the second row "n+1", as $A_1 \rightarrow B'_1 \rightarrow A_2 \rightarrow B'_2 \rightarrow A_3 \rightarrow B'_3$.

After the fourth head B' has scanned the track "b" at the scanning position B'$_3$, the third head starts scanning the track "a" of a third row "n+2" at the scanning position A$_7$ instead of the scanning position A$_4$ of the first head A. Sequentially the second head B scans the track "a" on the second row "n+1" at the scanning position B$_4$. The second and third heads B and A' respectively and alternatively scan the track "b" of the second row "n+1" and the third row "n+2", as A'$_7$→B$_4$→A'$_8$→B$_5$→A'$_9$→B$_6$, three times for each corresponding track in the same manner. Namely, the number of scans by the two heads, i.e. the first and fourth heds A and B' or the second and third heads B and A', is 6, viz. "m". Therefore, each head scans the same track three times viz. m/2.

From the foregoing it will be understood that video signals recorded on the sequential tracks are reproduced in the same manner in a sequence. With this provision, a high quality slow-motion picture is obtained by selectively supplying the output signals of the four heads A$_1$, B$_1$, B' and B' via a switching circuit. Above mentioned switching circuit interposed between the four heads A, B, A' and B' and a video signal reproducing circuit will be described herein later.

Although the auxiliary heads, i.e. the third and fourth heads A' and B' are mounted in the rotary drum 3 at a higher level than the main heads, i.e. the first and second heads A and B as shown in FIG. 4b, these auxiliary heads A' and B' may be disposed at a lower position than the main heads A and B by the before mentioned distance "d." Further, one of the auxiliary heads may be positioned higher than the level of the main heads while the other auxiliary head is located at a lower level. Therefore, there are four possible arrangements, i.e. (1) both of the auxiliary heads A' and B' are higher, (2) both of the auxiliary heads A' and B' are lower, (3) third head A' is higher while fourth head B' is lower, (4) third head A' is lower while fourth head B' is higher.

The angular displacement γ of the auxiliary heads A' and B' is determined by the following equation so as to obtain succession of the frequency of the horizontal synchronizing signal reproduced by switching the output signals of the four heads A, B, A' and B', wherein α is 1, 2, 3 ..., R is obtained by dividing the radius of rotation of the heads A, B, A' and B' by the radius of the rotary drum 2, lH is the distance between two consecutive horizontal synchronizing signals measured along the longitudinal directions of the tracks "a" and "b."

$$\gamma = \pm(\alpha \cdot lH/R)$$

In the above equation, "+" indicates the direction of the scan and "−" indicates the opposite direction. Consequently, there are four possible arrangements for angular displacement of the auxiliary heads A' and B', i.e. (1) both of the auxiliary heads A' and B' are behind the main heads A and B in a direction of the rotation of the drum 2, (2) both of the auxiliary head A' and B' are respectively in front of the main heads A and B in the same direction, (3) the third head A' is behind the first head A while the fourth head B' is in front of the second head B in the same direction, (4) the third head A' is in front of the first head A while the fourth head B' is behind the second head B in the same direction.

Figures 6A, 6B, 7A, 7B, 8A, 8B, 9A, 9B:
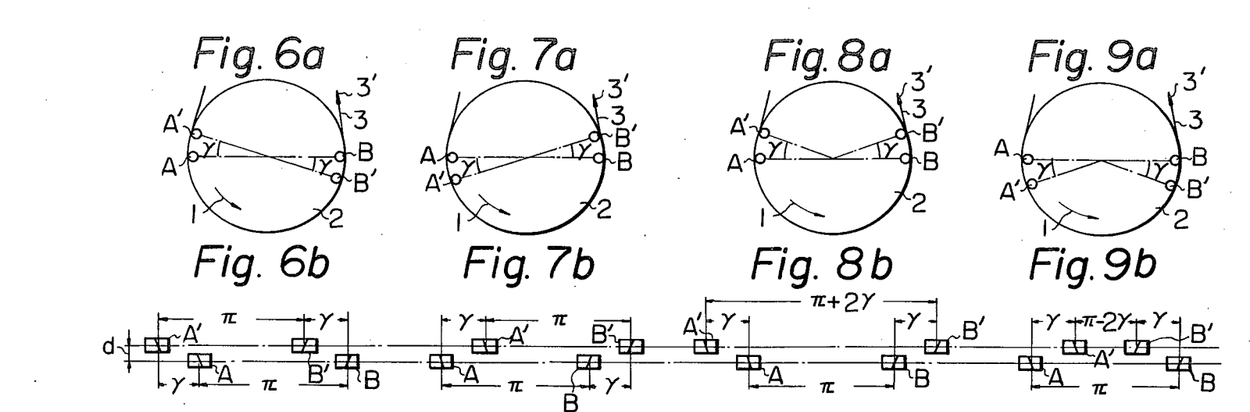
Figure 9C:
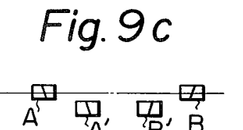
Figures 9D, 9E:
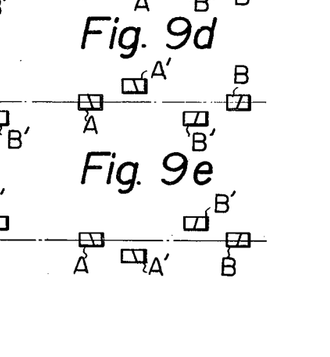

FIG. 6a to FIG. 9e show the above mentioned possible arrangements in combination of horizontal and vertical positions of the auxiliary heads A' and B'. There are as many as 16 possible arrangements since there are respectively 4 arrangements for each variations. In these figures although FIGS. 6a and 6b are same as FIGS. 4a and 4b, these are presented for convenience.

If a combination of the angular displacement shown in FIG. 6a and the height shown in FIG. 6c is utilized, i.e. when the third and fourth heads A' and B' are respectively located with an angle γ of delay from the first and second heads A and B while the vertical levels of the third and fourth heads A' and B' are below the level of the first and second heads A and B by the distance "d," the order of the scans is as follows: The track "a" of the third row "n+2" and the track "b" of the second row "n+1" are respectively and alternatively scanned by the first and fourth heads A and B; 3 times for each track at the scanning positions indicated by A$_7$→B'$_1$→A$_8$→B'$_2$→A$_9$→B'$_3$. After 6 scans (3 times for each track), the track "b" of the fourth row "n+3" and the track "a" of the third row "n+" are respectively and alternatively scanned by the second head B and the third A' 3 times for each track at the scanning positions indicated by A'$_7$→B$_{10}$→A'$_8$→B$_{11}$→A'$_9$→B'$_{12}$. In the same manner the video signals recorded on the sequential tracks are reproduced in a sequence.

If a combination of the angular displacement shown in FIG. 6a and the height shown in FIG. 6d is utilized, i.e. the third and fourth heads A' and B' are located with an angle of delay from the first and second heads A and B, while the vertical level of the third heads A' is higher than that of the first head A by the distance "D" and the vertical level of the fourth head B' is lower than that of the second head B by the distance "D," the following order of the scans is obtained: The track "B" of the row "n−1" ahead of the first row and the track "B" of the first row "n" are respectively and alternatively scanned by the fourth head B' and the first head A three times for each track. After these six times of scans the track "b" of the second row "n+1" and the track "a" of the third row "n+2" are respectively and alternatively scanned by the second head B and the third head A' three times for each track.

Next, the track "b" of the second row "n+1" and the track "a" of the third row "n+2" are respectively and alternatively scanned by the fourth head B' and the first head A three times for each track. After these six times of scans the track "b" of the fourth row "n+3" and the track "a" of the fifth row "n+4" are respectively and alternatively scanned by the second head B and the third head A' three times for each track. The video signals recorded on the sequential tracks are scanned and thus the signals are reproduced in the same manner in a sequence.

If a combination of the angular displacement shown in FIG. 6a and the height shown in FIG. 6e is utilized, i.e. the third and fourth heads are located with an angle γ of delay from the first and second heads A and B while the vertical level of the third head A' is lower than that of the first head A by the distance "d" and the vertical level of the fourth head B' is higher than that of the second head B by the distance "d", the following order of the scans is obtained: The track "a" of the first row "n" and the track "b" of the second row "n+1" are respectively and alternatively scanned by the first head A and the fourth head B' three times for each track at the scanning positions indicated by A$_1$→B'$_1$→A$_2$→B'$_2$→A$_3$→B'$_3$. After these six times of scans the track "b" of the second row "n+1" and the track "a" of the first row "n" are respectively and alternatively scanned by the second head B and the third head A' three times for each track at the scanning positions indicated by $A'_1 \rightarrow B_4 \rightarrow A'_2 \rightarrow B_5 \rightarrow A'_3 \rightarrow B_6$.

Next, the track "a" of the third row "n+2" and the track "b" of the fourth row "n+3" are respectively and alternatively scanned by the first and fourth heads A and B' three times for each track. After these six times of scans the track "b" of the fourth row "n+3" and the track "a" of the third row "n+2" are respectively and alternatively scanned by the second and third heads B and A' three times for each track. The video signals recorded in the sequential tracks are scanned and thus the signals are reproduced in the same manner in a sequence.

Since the slow-motion reproduction is performed in the same manner no matter what kind of combination of the horizontal and vertical positions shown in FIGS. 6a to 9e, is utilized, the description of the detailed operation of the other combinations is omitted.

As mentioned before, the slow-motion speed ratio "m" is set at as 6. However, the slow-motion speed ratio "m" may be any desired ratio such as 5 or 7. Although it is preferable to raise or lowers the magnetic tape partially so that the scan directions of the four head, A, B, A' and B' accord with the longitudinal directions of the tracks as mentioned hereinbefore, such compensation by raising or lowering may be omitted if a slight misstracking is permitted. In the embodiment shown in FIGS. 4a, 4b and 6a to 9e, the direction of the rotary drum 2 is same as that of magnetic tape 3. However, the direction of the rotary drum 2 may be opposite to that of the magnetic tape 3.

The vertical distance "d" between the main head A or B and an auxiliary head A' or B' may be suitably modified in accordance with conditions such as the gap distance of the four heads A, B, A' and B'.

Figure 10:
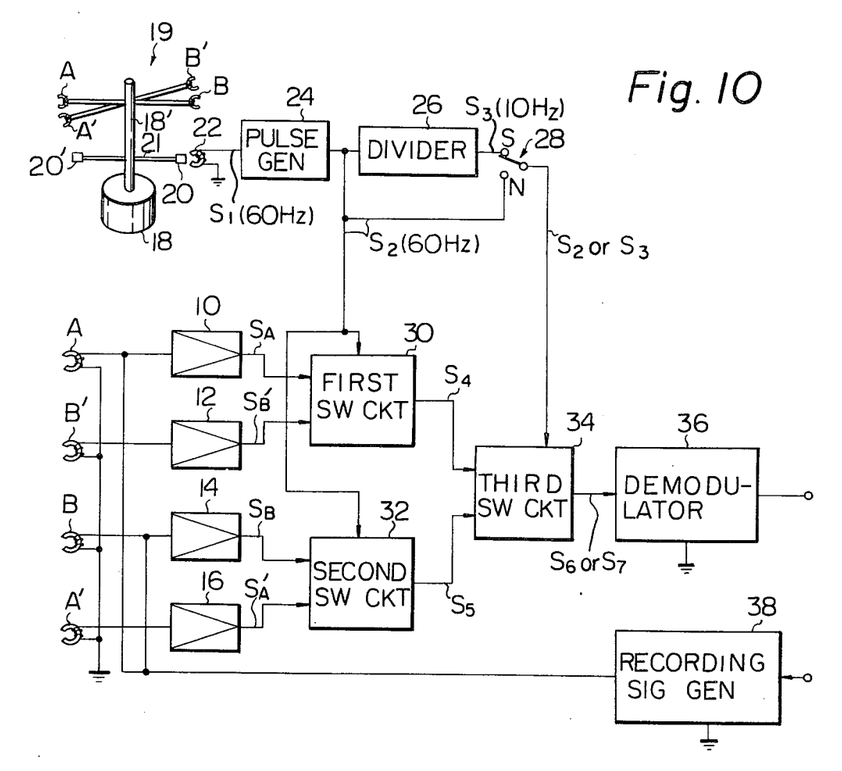
FIG. 10 shows a schematic block diagram of the video signal tape recording and reproducing apparatus according to the present invention.

Reference is now made to FIG. 10 which shows the switching circuit utilized for selectively supplying the output signals of the first to fourth heads A, B, A' and B' to a video signal reproducing circuit. Each terminal of the first to fourth heads A, B, A' and B' is connected to an input of reproduction amplifiers 10, 12, 14 and 16 while the other terminals of the heads A, B, A' and B' are grounded. The terminal of the first head A and the second head B is connected to each other and further connected to an output of a recording signal generator 38. The outputs of the amplifiers 10 and 12 are respectively connected to inputs of a first switching circuit 30 while the outputs of the amplifiers 14 and 16 are respectively connected to inputs of a second switching circuit 32. The outputs of the first and second switching circuits 30 and 32 are respectively connected to inputs of a third switching circuit 34. The output of the third switching circuit 34 is connected to an input of a demodulator 36. Inner mechanism 19 of the rotary drum 2 is shown by its perspective view. An electric motor 18 is connected to a shaft 18' to which the rotary drum 2 (not shown in FIG. 10 but in FIG. 4a) is connected. The four heads A, B, A' and B' are schematically shown disposed. Two magnets 20 and 20' are connected via a rod 21 to the shaft 18' so that the magnets 20 and 20' are arranged to rotate together with the shaft 18'. A pick up head 22 is disposed adjacent to the rotational locus of the magnets 20 and 20'. One terminal of the pick up head 22 is connected to an input of a pulse generator 24 while the other terminal of the pick up head 22 is grounded. The output of the pulse generator 24 is connected to an input of a divider 26 and is further connected respectively to the first and second switching circuits 30 and 32. The output of the pulse generator is still further connected to a terminal of a manual switch 28 while the output of the divider 26 is connected to another terminal of the switch 28. A terminal connected to a movable contact of the switch 28 is connected to the third switching circuit 34.

The function and operation of the circuitry shown in FIG. 10 will be described hereinafter. The recording signal generator 38 is arranged to generate recording signals corresponding to the odd fields and even fields. The recording signal is applied to the first and second heads A and B. These heads are arranged to magnetize a portion of the magnetic tape 3 wherein signals corresponding to the odd fields are recorded via the first head A while signals corresponding to the even fields are recorded via the second head B. As the magnets 20 and 20' rotate an electric current is induced across the coil included in the pick up head 22. Assuming the shaft rotates at 60 Hz, a 60 Hz A. C. signal is induced and is applied to the pulse generator 24 as a trigger signal so that the pulse generator 24 produces a train of pulses $S_2$ of 60 Hz. The output pulse signal $S_2$ is fed to the divider 26 and to the first and second switching circuits 30 and 32 so that the divider 26 produces a train of pulses $S_3$ of reduced frequency while the first and second switching circuits 30 and 32 are operated with the frequency of 60 Hz. The divider 26 is arranged to produce the output pulse signal $S_3$ where the frequency thereof is the frequency of the input signal $S_2$ divided by before mentioned "m." Since the "m" i.e. the slow-motion speed ratio is 6 in the preferred embodiment, the frequency of the pulse signal $S_3$ is 10 Hz. The manual switch 28 is a selector with which an operator or a user of the video signal tape recorder may select one of the normal and slow-motion reproduction.

When normal reproduction is required, the manual switch 28 is selected to be "N" position so that signal $S_2$ of 60 Hz is fed to the third switching circuit 34. Since the first, second and third switching circuits are synchronized, the signal $S_A$ obtained by the amplifier 10 and the signal $S_B$ obtained by the amplifier 14 are alternatively supplied to the demodulator 36, i.e. the output signal $S_6$ of the third switching circuit 34 is produced by arranging the signals $S_A$ and $S_B$ in an order such as $S_A$, $S_B$, $S_A$, $S_B$ ..... .

When slow-motion reproduction is required the "S" position of the manual switch 28 is selected so that the signal $S_3$ of 10 Hz is fed to the third switching circuit 34.

With this arrangement the third switching circuit 34 alternatively transmits the signal $S_4$, i.e. the output of first switching circuit 30, and the signal $S_5$, i.e. the output of the second switching circuit 32, with a frequency of 10 Hz, i.e. the output signal $S_7$ of the third switching circuit 34, is produced by arranging the signals $S_A$, $S_A'$, $S_B$ and $S_B'$ in an order such as $S_A$, $S_B'$, $S_A$, $S_B'$, $S_A$, $S_B'$, $S_A'$, $S_B$, $S_A'$, $S_B$, $S_A'$, $S_B$. . .

Figure 11:
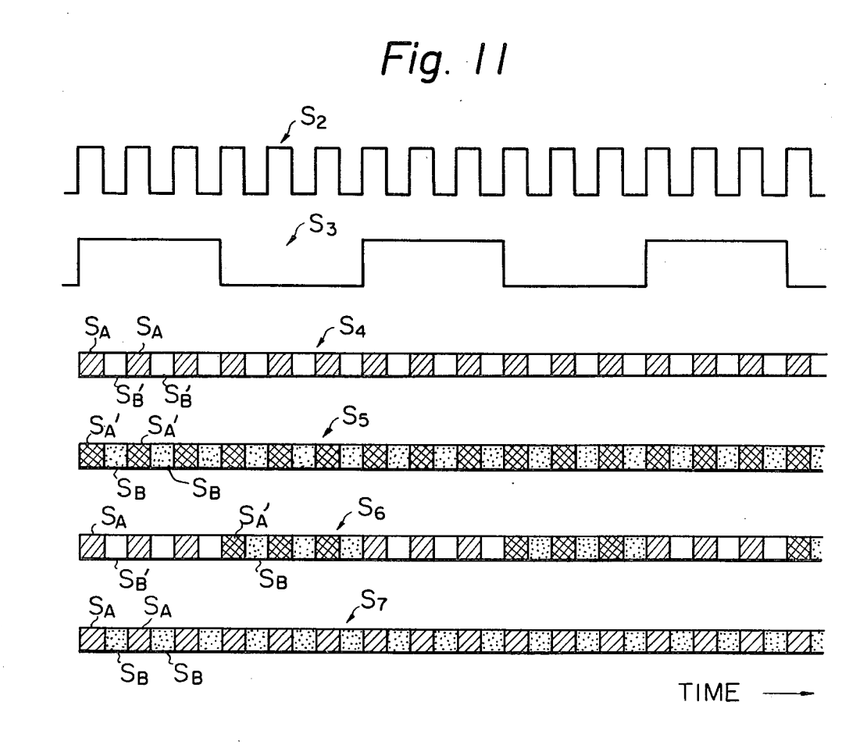
FIG. 11 shows in schematic waveform diagrams various signals obtained in the circuit shown in FIG. 10.

FIG. 11 illustrates the relationship among signals $S_2$, $S_3$, $S_4$, $S_5$, $S_6$, $S_7$. Signals $S_6$ and $S_7$ are shown obtained by selectively and periodically passing the signal $S_4$ and the signal $S_5$ wherein the switching frequency 60 Hz or 10 Hz. It is to be noted that the signals $S_6$ and signal $S_7$ are respectively obtained corresponding to the selection of the normal reproduction or the slow-motion reproduction.

What is claimed is:

1. A method of slow-motion play back of video signals recorded on a magnetic tape, said recorded signals being recorded by first and second heads diametrically opposed in rotary drum, said magnetic tape being arranged to pass helically on the peripheral surface of said rotary drum at a first predetermined speed during recording and normal reproduction and at a second predetermined speed which is lower than said first predetermined speed during slow-motion play back, said video signals being recorded on sequential parallel tracks by said first and second heads alternatively where a video signal corresponding to an odd field is arranged to be supplied to said first head while a video signal corresponding to an even field is arranged to be supplied to said second head so that the signals respectively corresponding to the odd and even fields are recorded on every other tracks, the orientation of the gaps of said first and second heads being arranged in opposite directions with respect to the traverse direction of said tracks on the magnetic tape, said slow-motion play back method comprising the steps of:

(a) scanning said tracks by not only said first and second heads but also third and fourth heads which are additionally provided and respectively located adjacent to said first and second heads, the orientation of the gap of said third head with respect to the traverse direction of said tracks, being equal to that of said first head while the orientation of the gap of said fourth head with respect to the traverse direction of said tracks, is equal to that of said second head; and (b) switching the output signals of said first, second, third and fourth heads so that said first and fourth heads effectively scan a first set of two consecutive tracks respectively and alternatively a plurality of times, and then said second and third heads effectively scan a second set of two consecutive tracks respectively and alternatively a plurality of times.

2. A method as claimed in claim 1, wherein said third and fourth heads respectively locate with a predetermined angle from said first and fourth heads with respect to the axis of said rotary drum, said predetermined angle $\gamma$ (radian) being obtained by:

$$\gamma = \pm(\alpha lH/R)$$

wherein $\alpha$ is an integer, R is obtained by dividing the radius of rotation of said third and fourth heads by the radius of said rotary drum, lH is the distance between two consecutive horizontal synchronizing signals measured along the longitudinal directions of the tracks on said magnetic tape, and "+" indicates the angle of lead of the third and/or fourth heads while "−" indicates the angle of delay of the fourth and/or third heads.

3. A method as claimed in claim 1, wherein the vertical distance between said first head and said third head and the vertical distance between said second head and said fourth head are equal to the track pitch of said tracks when the axis of rotation of said rotary drum is arranged vertically.

4. A method as claimed in claim 1 further comprising a step of shifting up or down a portion of said magnetic tape when a slow-motion reproduction is performed, so that the scan directions of said first, second, third and fourth heads accord with the longitudinal directions of the tracks on said magnetic tape.

5. A method of slow-motion play back of video signals recorded on a magnetic tape, said recorded signals being recorded by first and second heads diametrically opposed in a rotary drum, said magnetic tape being arranged to pass helically on the peripheral surface of said rotary drum at a first predetermined speed during recording and normal reproduction and at a second predetermined speed which is lower than said first predetermined speed during slow-motion play back, said video signals being recorded on sequential parallel tracks by said first and second heads alternatively where a video signal corresponding to an odd field is arranged to be supplied to said first head while a video signal corresponding to an even field is arranged to be supplied to said second head so that the signals respectively corresponding to the odd and even fields are recorded on every other tracks, the orientation of the gaps of said first and second heads being arranged in opposite directions with respect to the traverse direction of said tracks on the magnetic tape, said slow-motion play back method comprising the steps of:

(a) scanning a $n^{th}$ track and a $n+1^{th}$ track which is immediately next to said $n^{th}$ track respectively and alternatively by said first head and a fourth head positioned adjacent to said second head, m/2 times where "n" is an integer and "m" is an integer indicative of a slow-motion speed ratio obtained by dividing said first predetermined speed by said second predetermined speed, the orientation of the gap of said fourth head being equal to that of said second head;

(b) scanning said $n+1^{th}$ track and a $n+2^{th}$ track which is immediately next to said $n+1^{th}$ track respectively and alternatively by said second head and a third head positioned adjacent to said first head, m/2 times, the orientation of the gap of said third head being equal to that of said first head; and (c) switching the output signals of said first, second, third and fourth heads for selectively obtaining a valid reproduced signal from one of said four heads for supplying said output signals to a video signal demodulator.

6. A method of slow-motion play back of video signals recorded on a magnetic tape, said recorded signals being recorded by first and second heads diametrically opposed in a rotary drum, said magnetic tape being arranged to pass helically on the peripheral surface of said rotary drum at a first predetermined speed during recording and normal reproduction and at a second predetermiend speed which is lower than said first predetermined speed druing slow-motion play back, said video signals being recorded on sequential parallel tracks by said first and second heads alternatively where a video signal corresponding to an odd field is arranged to be supplied to said first head while a video signal corresponding to an even field is arranged to be supplied to said second head so that the signals respectively corresponding to the odd and even fields are recorded on every other tracks, the orientation of the gaps of said first and second heads being arranged in opposite directions with respect to the traverse direction of said tracks on the magnetic tape, said slow-motion play back method comprising the steps of:

(a) scanning a $n-1^{th}$ track and a $n^{th}$ track which is immediately next to said $n-1^{th}$ track respectively and alternatively by a fourth head positioned adjacent to said second head and by said first head, m/2 times where "n" is an integer and "m" is an integer indicative of a slow-motion speed ratio obtained by dividing said first predetermined speed by said second predetermined speed, the orientation of the gap of said fourth head being equal to that of said second head;

(b) scanning a n+1$^{th}$ track which is immediately next to said n$^{th}$ track and said n$^{th}$ track respectively and alternatively by said second head and a third head positioned adjacent to said first head, m/2 times, the orientation of the gap of said third head being equal to that of said first head;

(c) switching the output signals of said first, second, third and fourth heads for selectively obtaining a valid reproduced signal from one of said four heads for supplying said output signals to a video signal demodulator.

7. A method of slow-motion play back of video signals recorded on a magnetic tape, said recorded signals being recorded by first and second heads diametrically opposed in a rotary drum, said magnetic tape being arranged to pass helically on the peripheral surface of said rotary drum at a first predetermined speed during recording and normal reproduction and at a second predetermined speed which is lower than said first predetermined speed during slow-motion play back, said video signals being recorded on sequential parallel tracks by said first and second heads alternatively where a video signal corresponding to an odd field is arranged to be supplied to said first head while a video signal corresponding to an even field is arranged to be supplied to said second head so that the signals respectively corresponding to the odd and even fields are recorded on every other tracks, the orientation of the gaps of said first and second heads being arranged in opposite directions with respect to the traverse direction of said tracks on the magnetic tape, said slow-motion play back method comprising the steps of:

(a) scanning a n−1$^{th}$ track and a n$^{th}$ track which is immediately next to said n−1$^{th}$ track respectively and alternatively by a fourth head positioned adjacent to said second head and by said first head, m/2 times where "n" is an integer and "m" is an integer indicative of a slow-motion speed ratio obtained by dividing said first predetermined speed by said second predetermined speed, the orientation of the gap of said fourth head being equal to that of said second head;

(b) scanning a n+1$^{th}$ track which is immediately next to said n$^{th}$ track and a n+2 which is immediately next to said n+1$^{th}$ track respectively and alternatively by said second head and a third head positioned adjacent to said first head, m/2 times, the orientation of the gap of said third head being equal to that of said first head;

(c) scanning said n+1$^{th}$ track and said n+2$^{th}$ track respectively and alternatively by said fourth and said first heads m/2 times;

(d) scanning a n+3$^{th}$ track which is immediately next to said n+2$^{th}$ track, and a n+4$^{th}$ track which is immediately next to said n+3$^{th}$ track respectively and alternatively by said second and third heads m/2 times, and (e) switching the output signals of said first, second, third and fourth heads for selectively obtaining a valid reproduced signal from one of said four heads for supplying said output signals to a video signal demodulator.

8. A method of slow-motion play back of video signals recorded on a magnetic tape, said recorded signals being recorded by first and second heads diametrically opposed in a rotary drum, said magnetic tape being arranged to pass helically on the peripheral surface of said rotary drum at a first predetermined speed during recording and normal reproduction and at a second predetermined speed which is lower than said first predetermined speed during slow-motion play back, said video signals being recorded on sequential parallel tracks by said first and second heads alternatively where a video signal corresponding to an odd filed is arranged to be supplied to said first head while a video signal corresponding to an even field is arranged to be supplied to said second head so that the signals respectively corresponding to the odd and even fields are recorded on every other tracks, the orientation of the gaps of said first and second heads being arranged in opposite directions with respect to the traverse direction of said tracks on the magnetic tape, said slow-motion play back method comprising the steps of:

(a) scanning a n$^{th}$ track and a n+1$^{th}$ track which is immediately next to said n$^{th}$ track respectively and alternatively by said first head and a fourth head positioned adjacent to said second head, m/2 times where "n" is an integer and "m" is an integer indicative of a slow-motion speed ratio obtained by dividing said first predetermined speed by said second predetermined speed, the orientation of the gap of said fourth head being equal to that of said second head;

(b) scanning said n$^{th}$ track and said n+1$^{th}$ track respectively and alternatively by a third head positioned adjacent to said first head and by said second head, m/2 times, the orientation of the gap of said third head being equal to that of said first head;

(c) scanning a n+2$^{th}$ track which is immediately next to said n+1$^{th}$ track and a n+3$^{th}$ track which is immediately next to said n+2$^{th}$ track respectively and alternatively by said first and fourth heads m/2 times;

(d) scanning said n+$^{th}$ track and said n+3$^{th}$ track respectively and alternatively by said third and second heads m/2 times; and (e) switching the output signals of said first, second, third and fourth heads for selectively obtaining a valid reproduced signal from one of said four heads for supplying said output signals to a video signal demodulator.

9. A helical scan video signal tape recorder comprising:

(a) a cylindrical rotary drum;

(b) means for driving a magnetic tape so that the magnetic tape helically slides on the peripheral surface of said rotary drum at a first predetermined speed during recording and normal reproducing;

(c) means for driving said magnetic tape so that the magnetic tape helically slides on the peripheral surface of said rotary drum at a second predetermined speed which is lower than said first predetermined speed during slow-motion reproduction;

(d) means for rotating said rotary drum at third predetermined speed which is higher than said first predetermined speed;

(e) first and second heads disposed in said rotary drum, said first and second heads being diametrically opposed in said rotary drum with respect to the axis of said rotary drum and being arranged to rotate together with said drum, the orientations of the gaps of said first and second heads being arranged in opposite directions with respect to the traverse direction of tracks defined by paths of heads scans on the magnetic tape;

(f) a first electric circuitry for producing a recording signal to be recorded via said first and second heads, said recording signal including a signal corresponding to an odd field which is recorded via said first head and a signal corresponding to an even field which is recorded via said second head;

(g) third and fourth heads respectively positioned adjacent to said first and second heads so as to rotate together with said first and second heads, said first, second, third and fourth heads being arranged to respectively and alternatively scan a corresponding track when slow-motion reproduction is performed m/2 times wherein m is an integer indicative of a slow-motion ratio obtained by dividing said first predetermined speed by said second predetermined speed, the orientations of the gaps of said third and fourth heads with respect to the traverse direction of the tracks on the magnetic tape, are respectively equal to those of said first and second heads;

(h) second electric circuitry for demodulating video signals from the output signals of said first, second, third and fourth heads; and (i) switching means interposed between said second electric circuitry and said first, second, third and fourth heads for transmitting the output signals of said first and fourth heads alternatively a plurality of times and then transmitting the output signals of said second and third heads alternatively a plurality of times, to said second electronic circuitry.

10. A video signal tape recorder as claimed in claim 9, wherein said third and fourth heads are respectively positioned with a predetermined angle $\gamma$ with respect to the axis of said rotary drum from said first and second heads, said predetermined angle $\gamma$ being obtained by:

$$\gamma = \pm (\alpha \cdot lH)/R$$

wherein $\alpha$ is an integer, R is obtained by dividing the radius of rotation of said third and fourth heads by the radius of said rotary drum, lH is the distance between two consecutive horizontal synchronizing signals measured along the longitudinal directions of the tracks on said magnetic tape, and "+" indicates the angle of lead of said third and/or fourth heads while "−" indicates the angle of delay of said third and/or fourth heads.

11. A video signal tape recorder as claimed in claim 9, wherein one of said third and fourth heads is located at an upper position or positions than those of said first and second heads while one of said third and fourth heads is located at a lower position or positions than those of said first and second heads when the axis of said rotary drum is arranged vertically, the vertical distance between said first and third heads and the vertical distance between said second and fourth heads are equal to each other and further equal to the pitch of the tracks on said magnetic tape.

12. A video signal tape recorder as claimed in claim 9, further comprising means for shifting up or down said magnetic tape around said rotary drum partially.

13. A video signal tape recorder as claimed in claim 9, wherein said switching means comprising:

(a) a first switching circuit connected to said first and fourth heads for alternatively pass the output signals of said first and fourth heads with a first predetermined frequency;

(b) a second switching circuit connected to said second and third heads for alternatively pass the output signals of said second and third heads with said first predetermined frequency;

(c) a third switching circuit connected to said first and second switching circuits for alternatively pass the output signals of said first and second switching circuits with said first predetermined frequency when a normal reproduction is performed and with a second predetermined frequency which is lower than said first predetermined frequency when a slow-motion reproduction is performed;

(d) means for providing said first and second predetermined frequencies, said first predetermined frequency being obtained by doubling the rotational speed of said rotary drum, said second predetermined frequency being obtained by dividing said first predetermined frequency by said integer m.

* * * * *